US005768127A

United States Patent [19]

Murata

[11] Patent Number: 5,768,127

[45] Date of Patent: Jun. 16, 1998

[54] RECEIVED DATA PROCESSING SYSTEM FOR RECEIVING PERFORMANCE DATA HAVING REMOVABLE STORAGE

[75] Inventor: Yoshiyuki Murata, Oume, Japan

[73] Assignee: Casio Computer Co., Ltd., Tokyo, Japan

[21] Appl. No.: 760,386

[22] Filed: Dec. 4, 1996

Related U.S. Application Data

[62] Division of Ser. No. 18,097, Feb. 17, 1993, Pat. No. 5,650, 945.

[30] Foreign Application Priority Data

Feb. 21, 1992 [JP] Japan .................................... 4-72638
Feb. 27, 1992 [JP] Japan .................................... 4-76054

[51] Int. Cl.$^6$ .................................... G06K 15/00

[52] U.S. Cl. .......................... 364/400.01; 84/602; 84/659

[58] Field of Search .......................... 364/514 A, 400.01; 84/602, 609, 622, 610, 626, 613, 629, 630, 645, 647, 649, 659

[56] References Cited

U.S. PATENT DOCUMENTS

| | | | |
|---|---|---|---|
| 4,285,041 | 8/1981 | Smith | 364/413.02 |
| 4,371,945 | 2/1983 | Karr et al. | 364/561 |
| 4,434,801 | 3/1984 | Jiminez et al. | 128/689 |
| 4,500,568 | 2/1985 | Tokitsu et al. | |
| 4,960,031 | 10/1990 | Farrand | 84/609 |
| 4,962,469 | 10/1990 | Ono et al. | |
| 5,065,321 | 11/1991 | Bezos et al. | 364/550 |
| 5,260,508 | 11/1993 | Bruti et al. | 84/622 |
| 5,278,348 | 1/1994 | Eitaki et al. | 84/636 |
| 5,281,754 | 1/1994 | Farrett et al. | 84/609 |

FOREIGN PATENT DOCUMENTS

| | | |
|---|---|---|
| 2 641 092 | 6/1990 | France . |
| 9010607 U | 1/1992 | Germany . |
| WO 90/00366 | 1/1990 | WIPO . |

*Primary Examiner*—James P. Trammell
*Attorney, Agent, or Firm*—Frishauf, Holtz, Goodman, Langer & Chick

[57] ABSTRACT

A received data processing system is composed of a transmitter which includes a transmission unit which sends by radio sensor data such as a pulse rate obtained by a pulse sensor, a wrist watch which receives the sensor data from the transmitter using a reception unit and displays it on a display, and an external storage attached removably to the wrist watch for storing the received sensor data. Since the transmitter is attached closely to the human body to sense a pulse rate, detection of the pulse rate is ensured even if the user is in exercise. Since data on the pulse rate is stored in the removable external storage through the wrist watch, the system can process a large amount of data.

25 Claims, 15 Drawing Sheets

FIG.13

| ADDRESS | CHANNEL (CH) NO. | TIMBRE NO. | BROADCAST TIME ZONE |
|---|---|---|---|
| 1 | 1 | 3 (PIANO TONE) | AM6:00~AM9:00 |
| 2 | 3 | 1 (GUITAR TONE) | AM9:00~PM3:00 |
| 3 | 1 | 2 (SAXOPHONE TONE) | PM3:00~PM6:00 |
| ⋮ | ⋮ | ⋮ | ⋮ |

FIG.16

| ADDRESS | AUTOMATIC PERFORMANCE DATA | TIMBRE NO. | AUTOMATIC PERFORMANCE TIME |
|---|---|---|---|
| 1 | A-1 MUSIC (CLASSIC) | 3 (PIANO TONE) | 3 HOURS |
| 2 | 3-B MUSIC (JAZZ) | 1 (GUITAR TONE) | 6 HOURS |
| 3 | 1-B MUSIC (CLASSIC) | 2 (SAXOPHONE TONE) | 3 HOURS |
| ⋮ | ⋮ | ⋮ | ⋮ |

RECEIVED DATA PROCESSING SYSTEM FOR RECEIVING PERFORMANCE DATA HAVING REMOVABLE STORAGE

This is a division of application Ser. No. 08/018,097 filed Feb. 17, 1993 U.S. Pat. No. 5,650,945.

BACKGROUND OF THE INVENTION

1. Field of the Invention

The present invention relates to received data processing systems which process received data, using a wrist watch type electronic device.

2. Background Art

Some recent wrist watches have been developed which measure a pulse and a pace rate of the user and display the result of the measurement, along with addition of more functions to the such watches. For example, a wrist watch which measures the pulse rate of the user is provided with a pulse sensor in the watch case which functions so as to store and display the pulse rate of the user when the user touches a sensing surface of the sensor with his finger.

However, since the user is required to touch his finger on the wrist watch in the measurement of the pulse rate, using the conventional system, the measurement cannot be made, for example, during his exercise or working. Thus, the watch is inconvenient to use. In addition, since portability is considered preferentially, the watch has no satisfactory amount of data storage. An increase in the amount of storage of data may overflow the storage capacity and be lost without being stored. The already stored old data may be erased disadvantageously.

SUMMARY OF THE INVENTION

It is therefore an object of the present invention to provide a received data processing system which has a large capacity of storage to allow a received large amount of data to be processed.

In order to achieve the above object, the present invention provides a received data processing system comprising:

transmission means comprising a sensor and sending means for sending sensor data obtained from said sensor;

electronic means comprising reception means for receiving the sensor data from said transmission means and display means for displaying the sensor data received by said reception means; and external storage means attached removably to said electronic means and including memory means for storing the sensor data displayed on said display means.

This arrangement permits a received large amount of sensor data to be processed.

BRIEF DESCRIPTION OF THE DRAWINGS

FIG. 1 is a block diagram of the first embodiment.

FIG. 2 is a perspective view of a wrist watch of the system of FIG. 1.

FIG. 3 is a perspective view of the wrist watch with an open lid.

FIG. 4 is a front view of one example of a display of the wrist watch.

FIG. 5 is a cross-sectional view of an external storage.

FIG. 6 is an internal schematic of a memory of the wrist watch.

FIG. 7 is a flowchart indicative of the operation of the wrist watch.

FIGS. 8–17 show a second embodiment of a received data processing system taking the form of a wrist watch according to the present invention.

FIG. 8 shows the appearance of an essential portion of the wrist watch as the second embodiment.

FIG. 9 is a perspective view of the wrist watch with an open lid in the second embodiment to show the state of the watch before an IC memory is attached.

FIG. 10 is a plan view of an automatic performance operation unit of the second embodiment.

FIG. 11 is a schematic of an overall circuit of the second embodiment.

FIG. 12 shows one example of broadcasting programs.

FIG. 13 shows one example of the contents of data stored in a registration memory of the second embodiment.

FIG. 14 is a flowchart indicative of a process for automatic performance based on received automatic performance data.

FIG. 15 is a flowchart continued to a step SA2 of the flowchart of FIG. 7 and indicative of a process for presetting a program.

FIG. 16 shows one example of the contents of data stored in an automatic performance data memory.

FIG. 17 is a flowchart indicative of a process for performing musical score display and automatic performance based on data stored in the automatic performance data memory.

DETAILED DESCRIPTION OF THE PREFERRED EMBODIMENTS

First Embodiment

Figure 1:
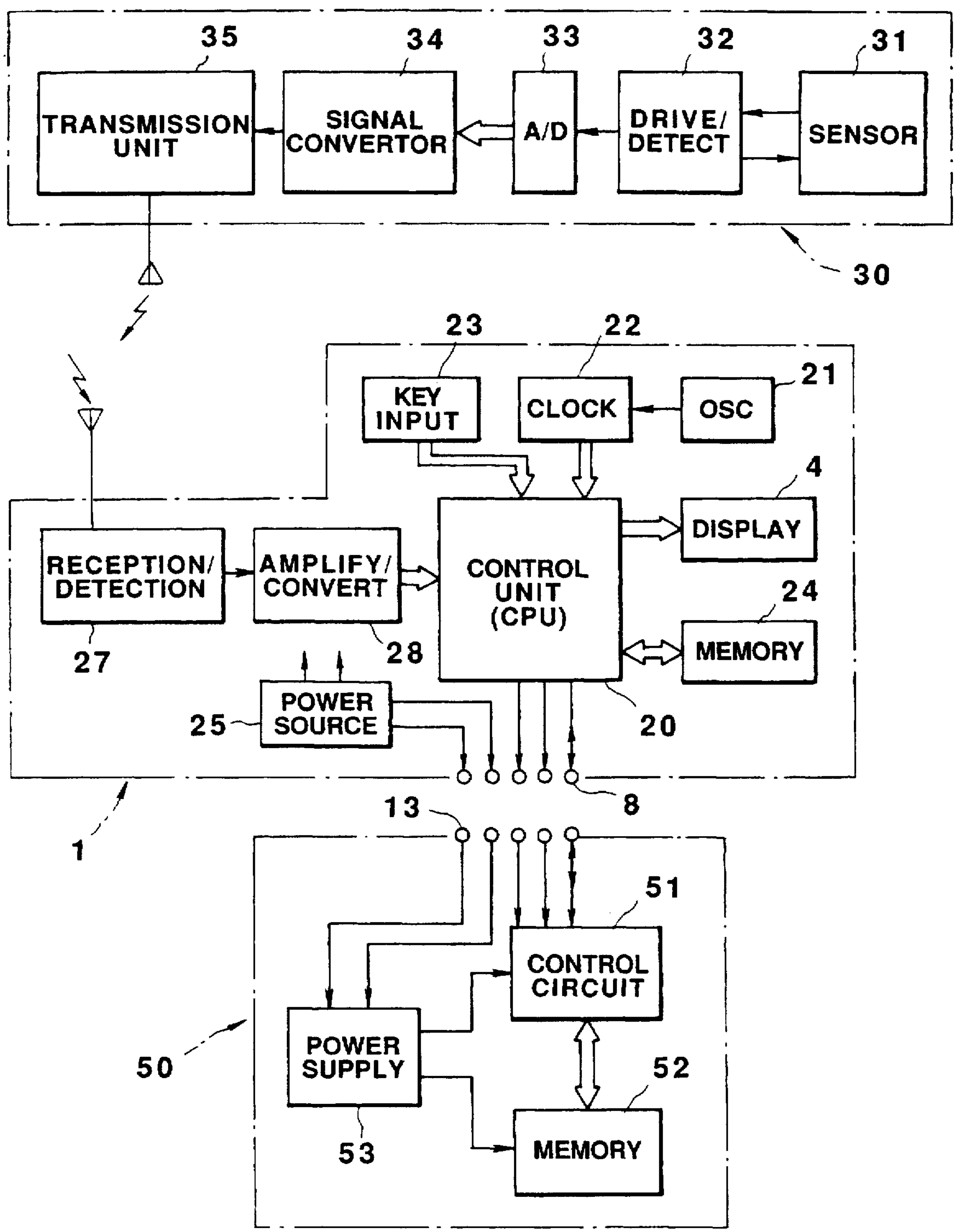
FIGS. 1–7 show a first embodiment of a received data processing system according to the present invention.

FIGS. 1–7 shows a first embodiment of a received data processing system according to the present invention. The system is provided with a wrist watch 1, a transmitter 30 and an external storage 50.

The transmitter 30 is attached to the user's body and senses data such as a measured pulse rate, electrocardiographic waves or a pace rate and sends the sensed data to the wrist watch 1. The transmitter 30 is provided with a sensor 31 which is attached removably to the user's body at a position where data on his pulse or pace rate (sensor data) can well be sensed. For example, if the sensor is a pulse sensor, it is attached directly to an arm, finger or the neck of the user. If the sensor is an electrocardiographic wave sensor, it is attached to the user in the vicinity of his heart. If the sensor is an acceleration sensor which senses the pace rate of the user, it is attached to a belt or shoe of the user. The transmitter 30 is further provided with a drive/detection unit 32 which outputs a drive signal to such sensor 31 and which detects data sensed by the sensor 31, an A/D convertor 33 connected to the drive/detection unit 32 to convert an analog signal from the drive/detection unit 32 to a digital signal, a transmitted signal convertor 34 connected to the A/D convertor 33 to convert a parallel signal to a serial signal and a transmission unit 35 connected to the convertor 34 to transmit to the watch 1 the serially converted sensor data by radio.

Figure 2:
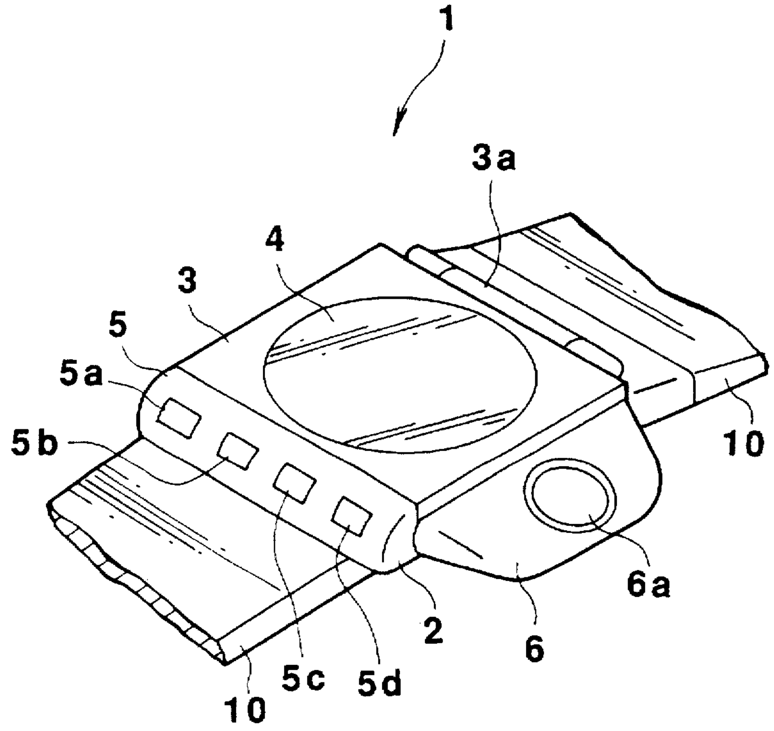
Figure 3:
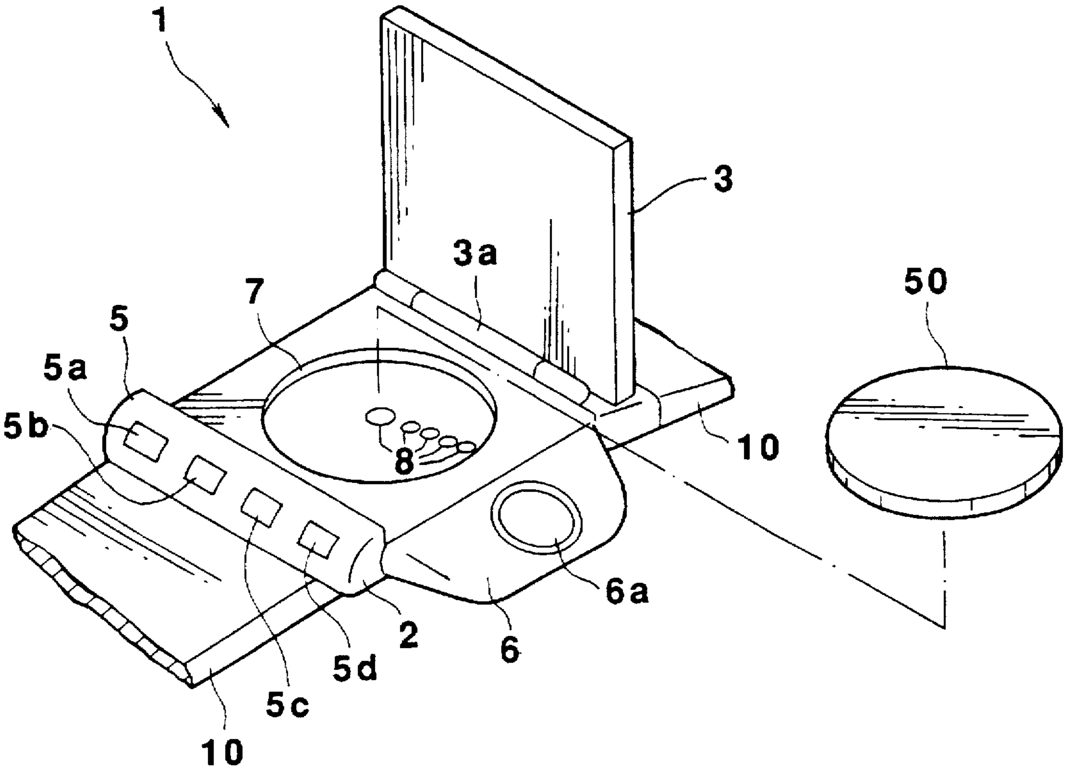

The wrist watch 1 receives sensor data from the transmitter 30 and displays it. To this end, the wrist watch 1 has the above function in addition to its proper time-keeping function. FIGS. 2 and 3 shows one example of the appearance of the watch 1. Bands 10 are attached to the opposite sides of the watch or device case 2. A lid 3 with a display 4 is attached to an upper surface of the case 2 so as to swing around a hinge shaft 3*a* to be opened/closed.

As shown in FIG. 3, the case 2 receives therein an external storage 50 in a recess 7 coverable with the lid 3. The storage 50 takes the form of a disc having a diameter of 20–35 mm and a thickness of 1–5 mm. Thus, the recess 7 has a shape corresponding to the disc shape. The recess 7 is provided with a connection terminal 8 which is adapted to be connected electrically to a connection electrode 13 (see FIG. 5) provided on the bottom of the external storage 50.

Figure 4:
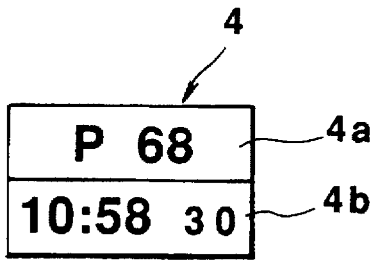

Referring to FIGS. 2 and 3, reference numeral 5 denotes a push button key unit provided at 6 o'clock on a side of the case 2 and having a plurality of push button switches 5*a*, 5*b*, 5*c* and 5*d* which are switched when operated. Reference numeral 6 denotes an antenna disposition section which extends at 3 o'clock from a side of the case 2 and has a circular antenna 6*a* attached thereto. FIG. 4 shows the display 4 which is provided with a data display section 4*a* and a time display section 4*b* each of which displays required data in a digital manner. The data display 4*a* displays sensor data and, in the shown example, a pulse rate, from the transmitter 30.

As shown in FIG. 1, the wrist watch 1 is provided with a control unit (CPU) 20 which controls the overall wrist watch, an oscillator 21 which fulfills a clocking function, and a clock 22 which clocks the current time. Reference numeral 23 denotes a key input unit corresponding to the push buttons 5*a*, 5*b*, 5*c*, and 5*d* (FIGS. 2, 3) and outputs signals from these push buttons to the control unit 20. Reference numeral 24 denotes a memory such as a RAM, and 25 a power source which supplies power from a battery (not shown) kept in the case 2 to the respective elements concerned. The wrist watch 1 is further provided with a receiver which receives sensor data from the transmitter 30. The receiver is provided with the antenna 6*a* disposed in the antenna disposition section 6 (FIG. 2) of the case 2, a reception/detection unit 27 which sends the sensor data received by the antenna 6*a*, and an amplification/signal conversion unit 28 which amplifies a signal from the reception/detection unit 27, converts it to a parallel signal, and outputs this signal to the control unit 28. The control unit 20 displays the sensor data from the amplification/signal conversion unit 28 and delivers the data to the external storage 50.

The external storage 50 is attached removably to the case 2 of the wrist watch 1 and stores the sensor data. As shown in FIG. 1, the storage 50 is provided with a control circuit 51 which controls the overall storage 50, a memory 52 which stores the sensor data from the watch 1, and a power supply 53 which supplies power to the control circuit 51 and the memory 52. The power supply 53 receives power from the power source 25 in the watch 1 through the connection electrode 13 and supplies power to the respective elements concerned. Thus, since no power source which drives the respective elements is required to be provided in the external storage 50, the external storage 50 is simplified in structure and reduced in size.

In the present embodiment, the memory 52 of the external storage 50 is provided with a RAM which stores much sensor data and a non-volatile memory such as an EEPROM. The non-volatile memory stores an application program which displays the sensor data on the display 4 of the watch 1 such that the program is called to the control unit 20 of the watch 1 in accordance with a signal from the key input unit 23 of the watch to thereby control the display of the data on the display 4.

Figure 5:
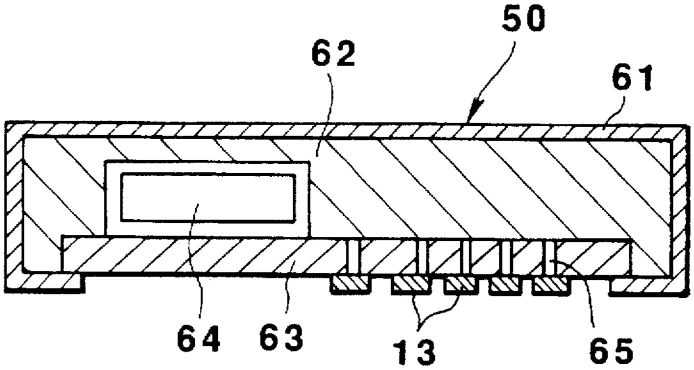

FIG. 5 shows the internal structure of the external storage 50, which takes the form of a disc, as shown in FIG. 3, and is provided with a disc-like case 61, an internal frame 62 placed in the case 61 and a circuit board 63 held between the case 61 and the frame 62. Attached to the circuit board 63 is an LSI 64 which is provided with the control circuit 51 and the memory 52. Formed on a lower surface of the circuit board 63 is the connection electrode 13 which is electrically connected to the connection terminal 8 of the watch 1 and also electrically connected to the LSI 64 through a through hole 65.

Figure 6:
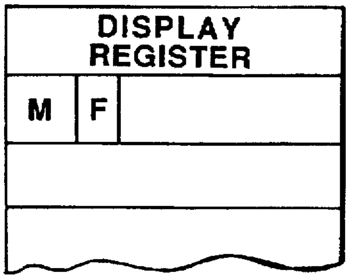

FIG. 6 shows the internal structure of the memory 24 of the watch 1. The memory 24 is provided with a "display register" which stores data displayed on the display 4, an "M" and an "F" register which store "0" or "1". The "M" register is a mode select register in which "0" or "1" is sequentially and selectively stored. When the "M" register stores "0", the watch 1 operates in the normal mode while when it stores "1", the watch operates in the recall mode. The "F" register is for selection of a measurement mode. When the "F" register is "0", no data from the sensor 31 is displayed while when it is "1", the measured data is displayed.

Figure 7:
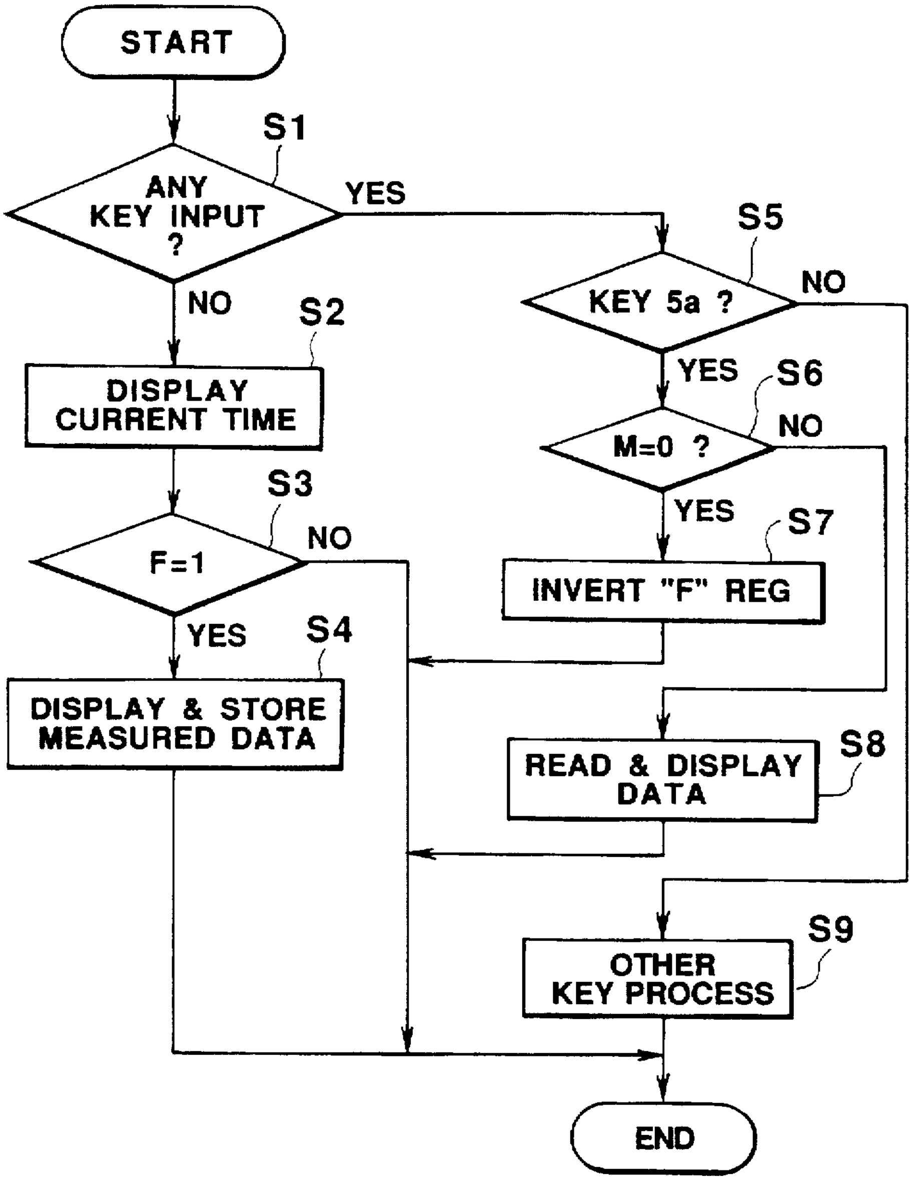

FIG. 7 shows a flowchart indicative of the operation of the control unit 20 of the watch 1 performed on the basis of the above conditions. At step S1 the control unit 20 determines whether there is any key input. If not, it displays the current time of the clock 22 on the display 4 (step S2). Thereafter, the control unit 20 determines the contents of the "F" register (step S3). When the "F" register is "1", the control unit displays on the display 4 the sensor data sensed by the sensor 31 and received by the antenna 6*a*, and sends and stores the data to and in the external storage 50 (step S4). When there is any key input at step S1, the control unit determines whether the key input is from the push button switch 5*a* (step S5) and then determines a numerical value in the "M" register (step S6). When the "M" register is "0", the control unit inverts the numerical value in the "F" register (step S7) while when the "M" register is "1", the control unit sequentially reads out the sensor data stored in the memory 52 of the external storage 50 and sequentially displays the data on the display 44 (step S8). Thus, the control unit can display the sensor data stored in the memory 52 in addition to the sensor data sensed by the sensor 31. When the "M" register is "1", and the control unit reads the data stored in the memory 52, no received sensor data is displayed. At step S5 when the input is a key input not from the push button switch 5*a* but from another push button switch, a corresponding process is performed (step S9).

Since the system of the present embodiment is composed of the transmitter 30 which senses and sends the sensor data, the wrist watch 1 which receives and displays the sensor data and the external storage 50 attached removably to the wrist watch 1 to store the sensor data, attachment of only the transmitter 30 to a predetermined position on the user body allows detection and display of the sensor data even when the user is in exercise or work. Since the external storage 50 stores the sensor data, it can store a large amount of data, modify and expand the data, and be free from loss of the data. Since in the present embodiment the external storage 50 stores the program which displays the stored sensor data, new sensed sensor data as well as the already stored sensor data can be displayed and hence the system is convenient in use.

The transmission/reception of the sensor data in the embodiment may be performed by radio, wire, electromagnetic induction or optical means such as infrared radiation. The sensor data which is sensed by the sensor may be data on electrocardiographic waves, blood pressure, body temperature, skin resistance or other data on the living body.

Second Embodiment

Figure 8:
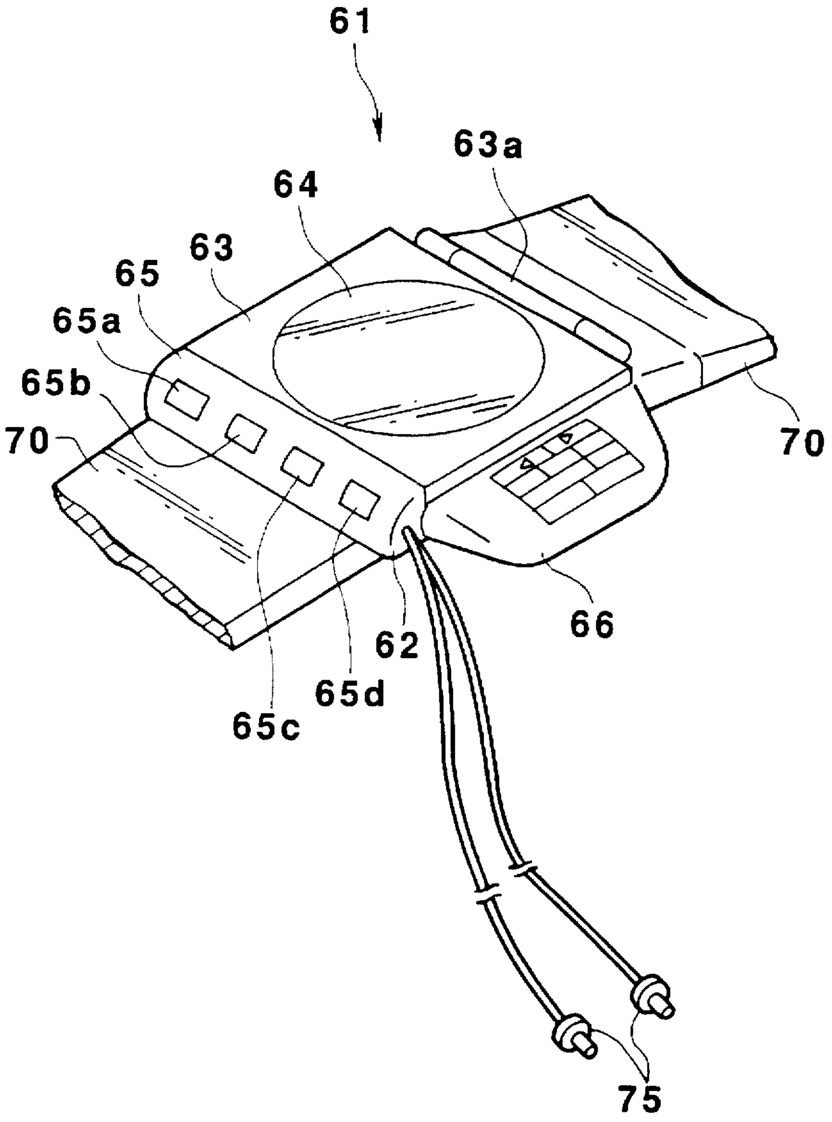
Figure 9:
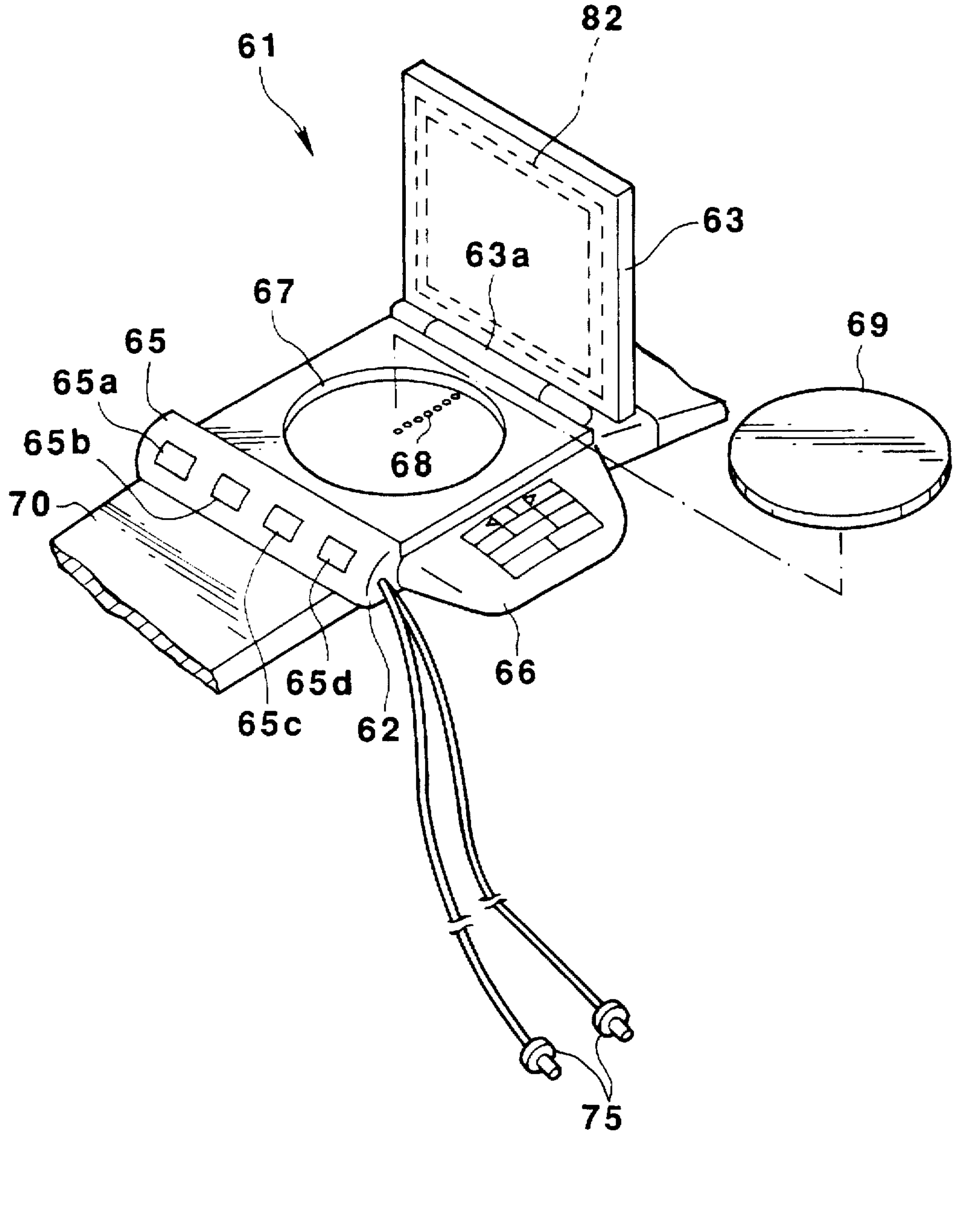

A second embodiment of a received data processing system taking the form of a wrist watch according to the present invention which processes received data on broadcasted electric waves will be described below with respect to FIGS. 8–17. Referring to FIG. 8, the wrist watch 61 is provided with a case 62, and a lid 63 provided above the case 62. As shown in FIG. 9, the lid 63 is connected openably through a hinge connection 63*a* to the case 62. The lid 63 is provided thereon with a liquid crystal display 64 which displays data such as year, month, date and time as a clocking function in a clock mode while it displays a musical score in an automatic performance mode.

Figure 10:
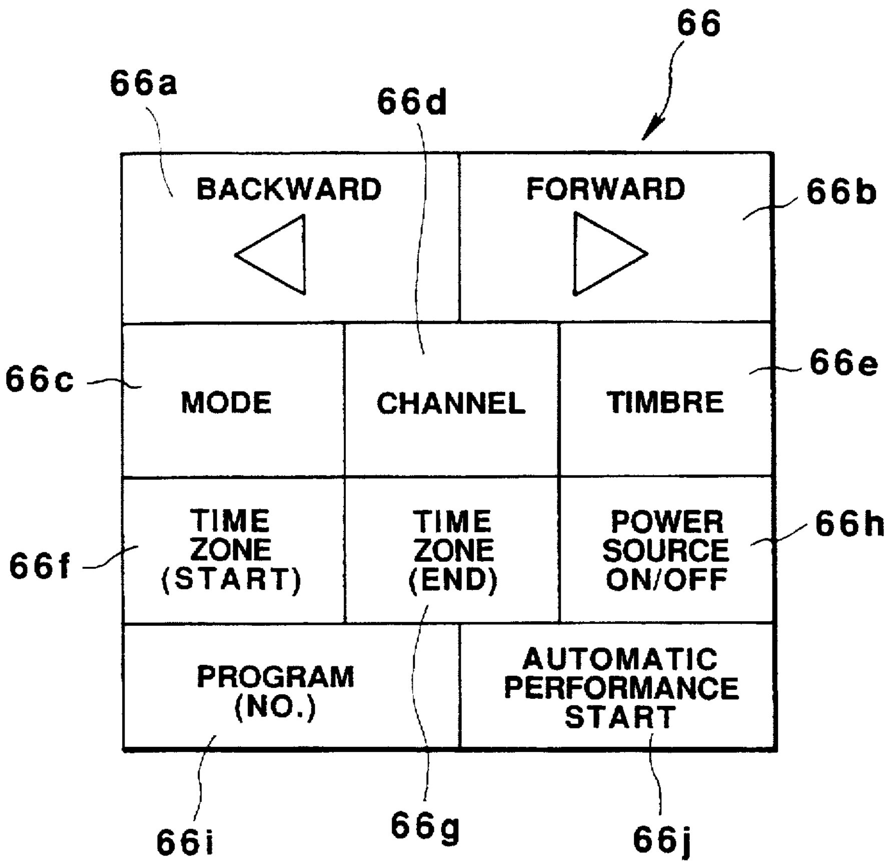

The case 62 is provided with a clock operation unit 65 and an automatic performance operation unit 66. It also is provided with a memory accommodating recess 67 coverable with the lid 63. The clock operation unit 65 is provided with keys 65*a*, 65*b*, 65*c* and 65*d*. As shown in FIG. 10, the automatic performance operation unit 66 is provided with a backward scrawl key 66*a*, a forward scrawl key 66*b*, a mode key 66*c*, a channel key 66*d*, a timbre key 66*e*, a time zone (start) key 66*f*, a time zone (end) key 66*g*, a power supply key 66*h*, a program (No.) key 66*i* and an automatic performance start key 66*j*. The respective keys 65*a*–65*d* provided in the clock operation unit 65 are used for adjustment of date, time, etc., in the clock mode while the respective keys 66*a*–66*j* provided in the automatic performance operation unit 66 are used for selection of a registration mode, a reception mode, and a reproduction mode and for presetting of a program. The memory accommodating recess 67 takes the form of a circular recess provided with a contact unit 68 made of plurality of contacts.

Received in the memory receiver 67 is an IC memory 69 taking the form of a disc on a lower surface of which a plurality of contacts (not shown) is formed. When the memory accommodating recess 67 receivers the IC memory 69 therein, the plurality of contacts provided on the IC memory 69 electrically contacts the corresponding plurality of contacts 68 provided on the memory receiver 67.

The case 62 has a pair of bands 70 and a pair of earphones 75 attached thereto. The lid 63 has a reception antenna 82 embedded therein.

Figure 11:
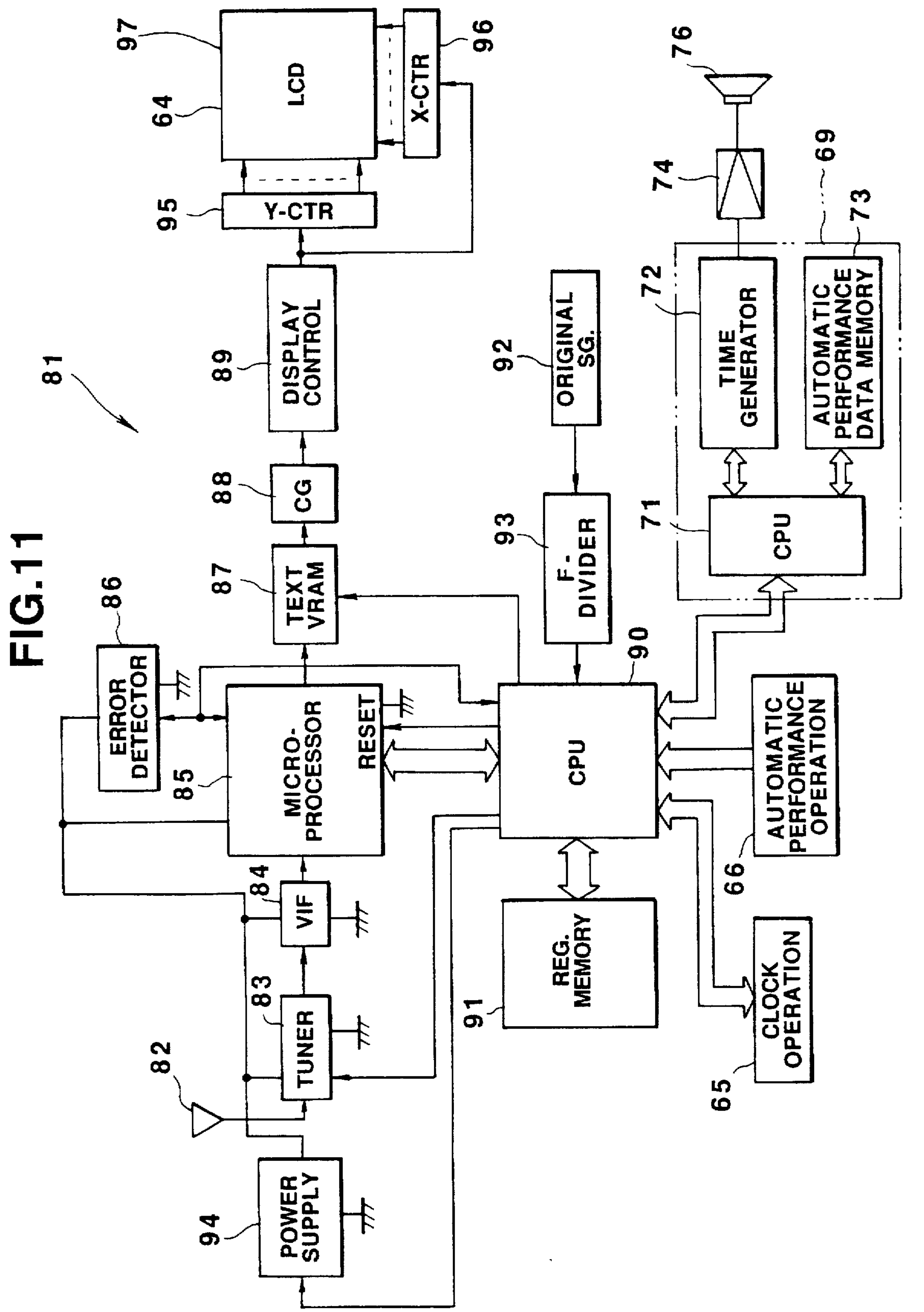
Figure 12:
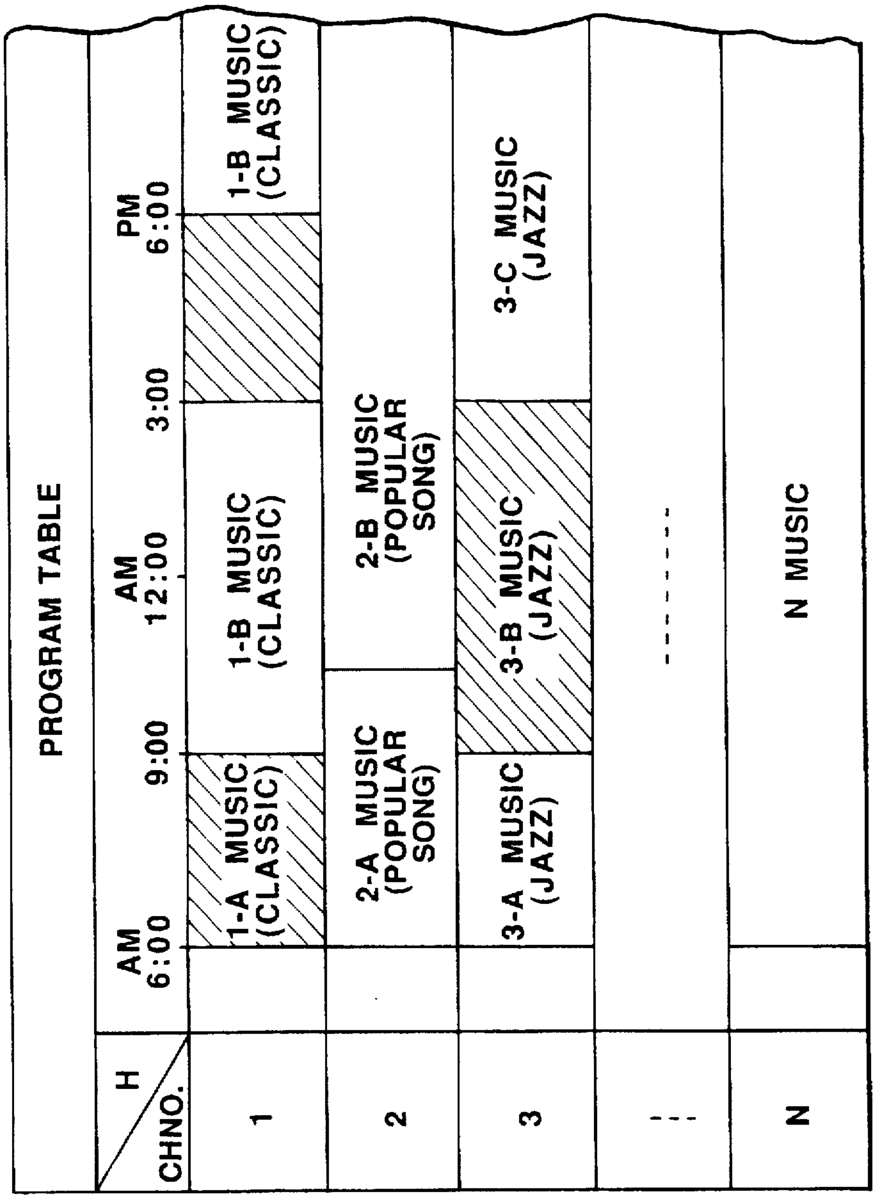

FIG. 11 is a block diagram of a broadcasting reception unit provided in the watch 61. The broadcasting unit 81 is provided with the antenna 82, a tuner 83, a VIF 84, a microprocessor 85, an error detector 86, a text VRAM 87, a CG (Computer Graphics) unit 88, a display controller 89, the display 64, a CPU 90, a registration memory 91, the clock operation unit 65, an automatic performance operation unit 66, an original signal generator 92, a frequency divider 93 and a power supply 94.

The power supply 94 converts power from a battery (not shown) to predetermined voltages and supplies them to the elements concerned of the broadcasting reception unit 81. In response to control signals from the CPU 90, the power supply 94 starts and ends the supply of power.

The broadcasting reception unit 81 receives broadcasted electric waves through the reception antenna 82, which feeds the received waves to the tuner 83. The tuner 83 is a so-called electronic tuner composed of coils, capacitors and resistors and which operates under control of the CPU 90. The tuner 83 tunes to a frequency designated by the CPU 90 and extracts and delivers a signal indicative of the frequency to the VIF 84. The VIF is composed of a demodulator and a detector (those elements are not shown) and demodulates and detects a signal from the tuner 83 and extracts automatic performance data (MIDI data) from the signal.

The microprocessor 85 is provided with an A/D convertor, a buffer and a decoder (all those elements are not shown) and converts an analog signal indicative of automatic performance data from the VIF 84 to a digital signal, using the A/D converter and stores the digital signal data in the buffer therein. The microprocessor 85 decodes the automatic performance data into note or rest data, using the decoder.

The digital signals stored in the buffer of the microprocessor 85 are sequentially fetched out and fed to the error detector 86, which detects and delivers the number of errors in the respective signals to the microprocessor 85 and the CPU 90. The text RAM 87 stores data on the positions and magnitudes of notes or rests on the display screen under of control of the CPU 90.

The CG 88 stores dot patterns corresponding to the magnitudes and types of notes and the types of rests. In response to a signal indicative of the position and magnitude of a note or a rest from the text VRAM 87, the CG 88 outputs a display dot pattern to the display controller 89, which is composed of an input order counter and a display position control unit (these elements are not shown). The display controller 89 generates a position signal and a display signal which sequentially display a train of dot patterns received from the CG 88 on the display screen from its upper left-hand corner to its lower right-hand corner and outputs the position and display signals to the display 64.

The display 64 is composed of a Y-CTR (controller) 95, a X-CTR 96, and an LCD 97. The LCD 97 is driven with drive signals from the Y- and X-CTRs 95 and 96, which outputs drive signals which control the designated on/off states to the respective coordinates on the LCD 97 on the basis of the position and display signals from the display controller 89. The LCD 97 has a dot matrix of displayed pixels which are lighted (for example, displayed dark) or become unlighted (displayed transparent) in accordance with drive signals from the Y- and X-CTRs 95 and 96. The LCD 97 has a staff notation printed thereon.

The CPU 90 is composed of a microprocessor, a ROM, a RAM, etc. The ROM stores a program for the broadcasting reception unit 81, selectable channel numbers and frequencies corresponding to the channel numbers. The RAM is used as a work memory. The microprocessor of the CPU 90 controls the respective elements concerned of the broadcasting reception unit 81 in accordance with the program in the ROM.

The automatic performance operation unit 66 performs various operations on the broadcasting reception unit 81 and designates a timbre to the CPU 71 in the IC memory 69 which will be described in more detail later. The channel 6*d* can select any one of broadcasting station channels 1–N in a program table shown in FIG. 12. The time zone (start) key 66*f* sets a time when the reception of a selected program starts while the time zone (end) key 66*g* sets a time when the reception ends. For example, when the channel key 6*d* selects a channel 1; the time zone (start) key 66*f* sets the start time at 6:00 a.m.; and the time zone (end) key 66*g* sets the end time at 9:00 a.m., 1-A (classic music) is received which is a program in channel 1 for 6:00–9:00 a.m. The power supply ON/OFF key 66*h* is used to turn on/off the power supply for the broadcasting reception unit 81.

When the channel key 66*d* is operated before the scrawl key 66*a* or 66*b* is operated, a channel is scrawled. When the timbre key 66*e* is operated before the key 66*a* or 66*b* is operated, the timbre No. is scrawled. When the scrawl key 66*a* or 66*b* is operated after the time zone (start) key 66*f* is operated, the reception start time is scrawled. When the time zone (end) key 66*g* is operated, the reception end time is scrawled. When the scrawl key 66*a* or 66*b* is operated after the program (No.) key 66*i* is operated, the address numbers stored in a registration memory 91 to be described in more detail later are scrawled.

The registration memory 91 is composed of a RAM or the like which stores data on automatic selection of a station. It has a format of FIG. 13 where storage regions for data on a channel (CH) No., a timbre No., and a broadcasting time zone are provided at each of addresses 1–N. The storage region for the channel (CH) No. stores data on the operation of the channel key 66*d* and the channel No. set by the scrawl key 66*a* or 66*b*. The storage region for a timbre No. stores data on a timbre No. such as 3 (piano tone), 1 (guitar tone) or 2 (saxophone tone) set by the operations of the timbre key 66*e* and scrawl key 66*a* or 66*b*. The storage region for a broadcasting time zone stores data on a reception start time set by the operation of the time zone (start) key 66*f* and the respective scrawl key 66*a* or 66*b* and data on a reception end time set by the operation of the time zone (end) key 66*g* and the scrawl key 66*a* or 66*b*.

The original signal generator 92 is a so-called crystal oscillator composed of a crystal, a resistor and a capacitor and which generates an original clock signal having a predetermined frequency. The frequency divider 93 is, for example, a cascaded combination of several binary counters which divides the original clock signal from the original signal generator 92 to produce and output to the CPU 90 a 1 Hz clock signal available as a reference clock signal. The CPU 90 clocks the current time on the basis of the clock signal from the frequency divider 93 to display the current time on the LCD 97, provide on/off control over the power supply for the broadcasting reception unit 81 and performs other various control operations.

The IC memory 69 is provided with a CPU 71, a tone generator 72 and an automatic performance data memory 73. The CPU 71 is composed of a microprocessor, a ROM, a RAM, etc. The ROM stores a program necessary for control of the tone generator 72 using automatic performance data received on a MIDI signal from the broadcasting station, and a program necessary for sequentially storing the automatic performance data into the automatic performance data memory 73. The RAM is used as a work memory. The microprocessor controls the tone generator 72 in accordance with the programs in the ROM to thereby achieve automatic performance means. The tone generator 72 generates a tone signal having a pitch, length, timbre and volume in conformity with commands from the CPU 71. The tone signal is amplified by an amplifier 74 and let out through the speaker 76 built in the pair of earphones 75.

In operation, when the broadcasting reception unit 81 receives no broadcasting, the LCD 97 displays the current time. That is, when the power supply on/off key 66*h* of the automatic performance operation unit 66 is off, the broadcasting reception unit 81 automatically sets the clock mode in which the CPU 90 clocks the current time in accordance with a clock signal from the frequency divider 93, determines the position of display of the current time and outputs data on the current time at a corresponding position in the text VRAM 87. The CPU 90 causes the text VRAM 87 to output data on the current time to the display controller 89 though the CG 68 to thereby cause the LCD 97 to display the current time at a required position on the LCD.

Figure 14:
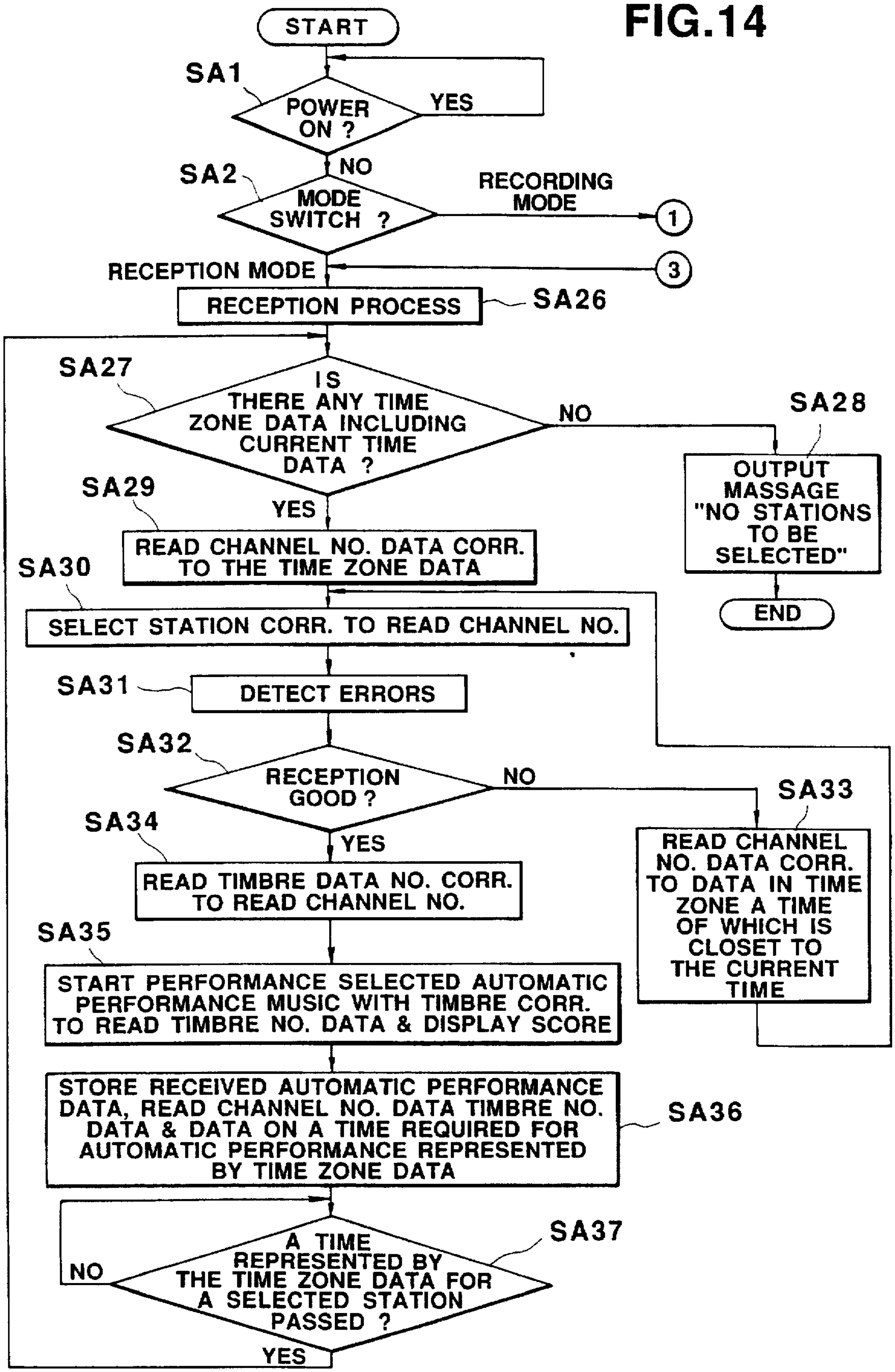
Figure 15:
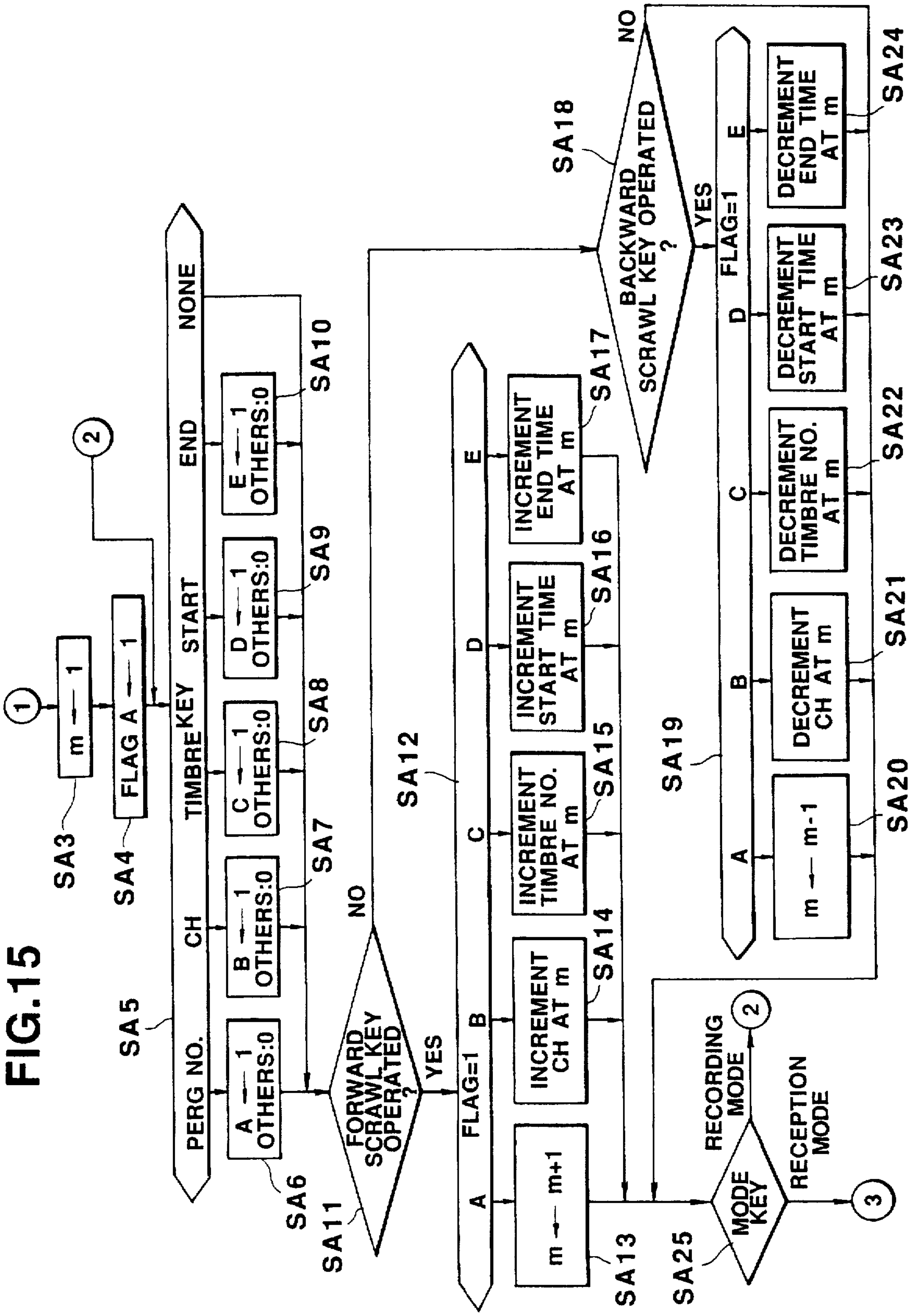

The CPU 90 operates in accordance with the flowchart shown in FIGS. 14 and 15. That is, it determines whether the power supply on/off key 66*h* of the automatic performance operation unit 66 is turned on (step SA1). If so, control passes to step SA2, where the CPU 90 determines on the basis of the operation state of the mode key 66*c* whether the set mode is the registration mode or the reception mode. If the set mode is the registration mode, control passes to step SA3 of FIG. 15, where the CPU 90 sets the initial value "1" as an address number m and sets a flag A (step SA4). Subsequently, the CPU determines whether any one of the program No. key 66*i*, channel key 66*d*, timbre key 66*e*, time zone (start) key 66*f*, and time zone (end) key 66*g* (step SA5).

When the program No. key 66*i* is operated on, the CPU sets only the flag A and resets other flags B, C, D and E (step SA6). When the channel key 66*d* is operated on, the CPU sets only the flag B and resets the other flags A, C and D (step SA7). When the timbre key 66*e* is operated on, the CPU operates only the flag C and resets the other flags A, B, D and E (step SA8). When the time zone (start) key 66*f* is operated on, the CPU sets only the flag D and resets the other flags A, B, C and E (step SA9). When the time zone (end) key 66*g* is operated on, the CPU sets only the flag E and resets the other flags A, B, C and D (step SA10). When no keys are operated, control passes immediately to step SA11.

At step SA11 the CPU 90 determines whether the forward scrawl key 66*b* has been operated. If so, it determines which of the flags A–E is the one set at steps SA6–SA10 (step SA12). If the set flag is A, the CPU increments the address number m (step SA13). If the set flag is B, the CPU increments a channel No. stored in the channel (CH) storage region indicated by the address No. m (step SA14). If the set flag is C, the CPU increments the timbre No. at the address m (step SA15). If the set flag is D, the CPU increments the start time at the address m (SA16). If the set flag is E, the CPU increments the end time at the address m (step SA17).

If no forward scrawl key 66*b* is operated, control passes from step SA11 to SA18, where the CPU determines whether the backward scrawl key 66*b* has been operated. If so, the CPU determines which of the flags A–E is set at steps SA6–SA10 (step SA19). If the set flag is A, the CPU decrements the address number m (step SA20). If the set flag is B, the CPU decrements the channel No. stored in the channel (CH) storage region indicated by the address number m (step SA21). If the set flag is C, the CPU decrements the timbre No. stored at the address m (step SA22). If the set flag is D, the CPU decrements the start time at the address m (step SA23). If the set flag is E, the CPU decrements the end time at the address m (step SA24).

After the CPU has executed the processes at steps SA13–SA17 according to the results of the determinations at steps SA11 and SA12 and the processes at steps SA20–24 according to the results of the determinations at steps SA18 and SA19, the CPU again determines which of the registration and reception modes is the mode set by the mode key 66*c* (step SA25). If the registration mode is set, the CPU iterates the determinations and processes at the steps SA4–SA24.

Thus, operation of any one of the program (No.) key 66*i*, channel key 66*d*, timbre key 66*e*, time zone (start) key 66*f*, and time zone (end) key 66*g* and any one of the forward and backward scrawl keys 66b and 66a in a state in which the registration mode is set brings about storage of data on the channel (CH) No. timbre No. and broadcasting time zone in the registration memory 91 at each address, as shown in FIG. 13.

If the mode is changed from the registration mode to the reception mode by the operation of the mode key 66c or if the reception mode is beforehand set when the power on/off switch 66h is switched on, control passes to step SA26 of FIG. 14, where the CPU performs the process for reception in which the CPU 90 outputs a control signal to command the power supply 94 to turn on. In response to this signal, the power supply 94 feeds power to the tuner 83, VIF 84, microprocessor 85, and error detector 86 to prepare a state for reception of automatic performance data.

Subsequently, at step SA27 the CPU 90 retrieves the stored data in the registration memory 91 of FIG. 13 at each address to determine whether there is time zone data including data on the current time among the data stored in the broadcasting time zone (step SA27). If not, the CPU outputs a message to cause the display 64 to display "there are no stations to be selected" (step SA28).

If there is time zone data including the current time at any address, the CPU reads out channel No. data corresponding to the appropriate time data (SA29). For example, assuming that the current time is 6:00 a.m., the time zone data 6:00–9:00 a.m. at address 1 shown in FIG. 13 includes the current time, so that the CPU reads out channel No. "1" which is the channel No. data corresponding to the 6:00–9:00 a.m. Subsequently, the CPU selects a broadcasting station corresponding to the read channel No. data (SA30), where the CPU sets in the tuner 83 a reception frequency from the channel No. 1 broadcasting station to thereby start the reception of automatic performance data from the channel No. 1 broadcasting station.

The CPU detects errors on the basis of error data (data on the number of errors) from an error detector 86 (step SA31) and then determines on the basis of the data on the number of errors from the error detector 86 whether the state of reception of subsequent automatic performance data from the appropriate broadcasting station is good (SA32). If the CPU determines that the state of the reception is not good, it reads out the channel No. data corresponding to data on the time zone a time of which is closest to the current time (step SA33).

For example, when the current time is 6:00 a.m. and hence the reception of the channel No. 1 broadcasting station stored at address 1 has started, it is assumed that the state of reception of the channel No. 1 is not good. In this case, data on the time zone closet to the current time 6:00 a.m. except for the channel No. 1 is 9:00 a.m.–3:00 p.m. The channel No. data corresponding to the time zone data 9:00 a.m.–3:00 p.m. is "3". Thus, the CPU reads out the channel No. 3. After this step SA33 processing, the CPU iterates the determinations and processes, starting at step SA33.

When the CPU determines on the basis of the number of errors that the state of reception is good, it reads out timbre No. data corresponding to the read channel No. data (step SA34), starts the performance of a selected automatic performance music with a timbre corresponding to the read timbre No. data and displays the corresponding musical score on the LCD 87 on the basis of the received automatic performance data (step SA35). For example, if the current time is 6:00 a.m. and the state of reception of the channel No. 1 is good, the CPU performs automatic performance of a 1-A music (classic music) shown in FIG. 12 in a piano tone with a timbre No. 3 on the basis of the automatic performance data received at this time and displays a musical score on the display 64 as at step SB5 which will be described in more detail later. This automatic performance is made by the CPU 71 built in the IC memory 69, which CPU sends to the tone generator 72 the read timbre No. data and the automatic performance data (MIDI data) transferred from the CPU 90 in the broadcasting reception unit 81 and which commands the generation of a tone signal having a pitch, length and loudness following the automatic performance data transferred with a timbre corresponding to the sent timbre No. data. The tone signal generated by the tone generator 72 is amplified by an amplifier 74 and the resulting signal drives a speaker 76 in the earphones 75 thereby cause a melody conforming to the automatic performance data to be let out from the earphones 75 as a piano tone corresponding to the timbre No.

If (1) the current time is, for example, 6:00 a.m., (2) the result of the determination at step SA32 indicates that the state of reception is not good and (3) the channel No. data "3" is read out by the process at step SA 33, as described above, the program for the channel No. 3 is 3-A music (jazz music) at a time of 6:00 a.m. and the timbre No. corresponding to the channel No. 3 is "1 (guitar tone)". Thus, the 3-A music (jazz music) is automatically performed with a guitar timbre. Therefore, in this case, a music which does not satisfy the desire of a hearer is automatically performed. Since whether the state of reception is good or not greatly influence the appropriateness of automatic performance, the appropriate automatic performance is made preferentially. If the state of reception is not good, a station involving a good state of reception is automatically selected against the desire of the hearer.

At step SA36 subsequent to step SA35 the CPU stores the received automatic performance data, read channel No. data, and timbre No. data, and data on a time required for automatic performance represented by time zone data into the automatic performance data memory 73 of the IC memory 69. Thus, the automatic performance data sequentially received is stored along with the corresponding channel No. data, timbre No. data, and data on a time required for automatic performance into the automatic performance data memory 73.

At SA37 the CPU determines whether the time represented by the time zone data for a selected station has passed. The CPU continues the execution of the automatic performance and the storage of the automatic performance data until the time has passed, at which time the CPU executes the processes at steps SA27–SA37. Thus assuming that the data of FIG. 13 is beforehand stored in the registration memory 91 and the state of reception of every channel is good, the respective data is stored in the automatic performance data memory 73, as shown in FIG. 16.

For example, automatic performance data on 1-A music (classic music), and data on 3 (piano tone) as the timbre No. and 3 hours from 6:00–9:00 a.m. as the automatic performance time are stored at address 1. Automatic performance data on 3-B music (jazz music), and data on 1 (guitar tone) as the timbre No. and 6 hours from 9:00 a.m.–3:00 p.m. as the automatic performance time are stored at address 2. Automatic performance data on 1-B music (classic music), and data on 2 (saxophone tone) as the timbre No. and 3 hours from 3:00–6:00 p.m. as the automatic performance time are stored at address 3.

When the CPU completes the automatic performance of the overall program stored in the registration memory 31, so that the time zone data including the current time disappears, the determination at step SA27 becomes NO and control passes from step SA27 to SA28, where the CPU outputs the above message and ends control corresponding to the reception mode.

Figure 17:
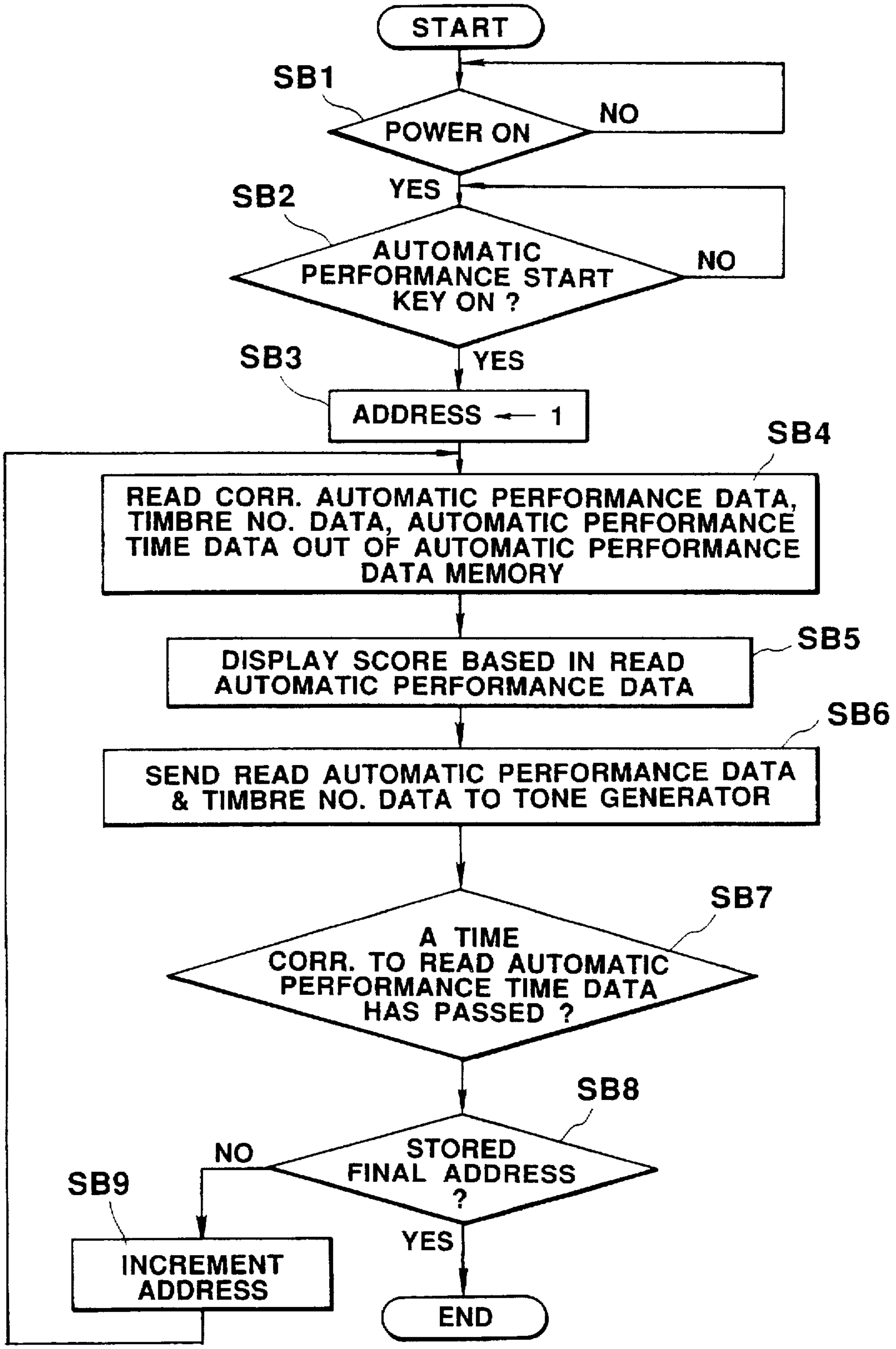

When the reproduction mode has been set by the operation of the mode key 66c, the CPU 71 in the IC memory 69 operates in accordance with the flowchart of FIG. 17. The CPU first determines whether the power supply on/off switch 66h is switched on (step SB1). If so, the CPU determines whether the automatic performance start switch 66j is switched on (step SB2), at which time the CPU sets the address at 1 (step SB3).

The CPU then reads out of the automatic performance data memory 73 automatic performance data, timbre No. data, and automatic performance time at that address (step SB4). AS shown in FIG. 16, if automatic performance data on 1-A music (classic music), and data on 3 (piano tone) as the timbre No. and 3 hours as the automatic performance time are stored at address 1, all the data at address 1 is read out.

Subsequently, the CPU sequentially displays as a 1-A music (classic music) a musical score shown by the read automatic performance data along with a staff notation on the display 64 with an LCD 97 on the basis of the read automatic performance data. The CPU then sends the read automatic performance data and the timbre No. data to the tone generator 72 (step SB6) such that the tone generator 72 generates a tone signal in accordance with the automatic performance data and the timbre No. data to thereby cause a music automatically performed with a timbre corresponding to the timbre No. data (classic tone) to be let out from the earphones 75, as described above.

The CPU then determines whether a time corresponding to the automatic performance time data read at step SB4 has passed (step SB7) and continues the automatic performance and display of a musical score on the basis of the read automatic performance data read out until the time has passed. When the time has passed, control passes from step SB7 to step SB8, where the CPU determines whether the address where the automatic performance data used for the display of the musical score and the automatic performance is stored is the stored final address, that is, whether reading all the data stored at each address in the automatic performance data memory 73 has been completed (step SB8).

For example, when the automatic performance based on the automatic performance data stored at address 1 has ended and no automatic performance based on the automatic performance data stored at addresses 2 and 3 is made, the CPU increments the address (step SB9) and iterates the processes and determinations at steps SB4–SB9. Thus, each time the display of the musical score and automatic performance on the basis of the automatic performance data stored at each address at step SB9 ends, the display of a musical score and automatic performance on the basis of the automatic performance data stored at the next address are sequentially made. When the display of the musical score and automatic performance on the basis of all the automatic performance data stored in the automatic performance data memory 73 has ended, control corresponding to the reproduction mode ends.

While in this embodiment the IC memory 69 is illustrated as being provided with the CPU 71 and the tone generator 72, arrangement may be such that the tone generator 72 and the automatic performance data memory 73 alone are provided on the side of the IC memory 69 and the CPU 90 in the broadcasting reception unit 81 controls the tone generator 72 or that only the automatic performance data memory 73 is provided on the side of IC memory 69 while the tone generator 72 is provided on the side of the broadcasting reception unit 81.

What is claimed is:

1. A received data processing system comprising a system body having a receiver for receiving performance data and an external storage unit provided removably to said system body, said system body comprising:

timbre selecting means for selecting any one of a plurality of timbre data;

storage control means for outputting the selected timbre data along with the received performance data to said external storage unit for storing purposes;

performance means for reading the performance data and timbre data stored in said external storage unit out of said external storage unit and performing a piece of music on the basis of the read performance data with a timbre on the basis of the read timbre data; and a station selector for selecting a transmission station which receives the performance data from among a plurality of transmission stations.

2. A received data processing system according to claim 1, wherein the performance data comprises automatic performance data on the basis of which said performance means makes an automatic performance.

3. A received data processing system according to claim 1, wherein said external storage unit takes the form of a disc.

4. A received data processing system according to claim 1, wherein said system body further comprises:

a receiving section having a terminal electrically connected to said external storage unit and for receiving said external storage unit; and a lid removably for covering said receiving section.

5. A received data processing system, comprising a system body having a receiver for receiving performance data and an external storage unit provided removably to said system body, said system body comprising:

timbre selecting means for selecting any one of a plurality of timbre data;

storage control means for outputting the selected timbre data alone with the received performance data to said external storage unit for storing purposes; and performance means for reading the performance data and timbre data stored in said external storage unit out of said external storage unit and performing a piece of music on the basis of the read performance data with a timbre on the basis of the read timbre data;

wherein said system body takes the form of a wrist watch.

6. A received data processing system according to claim 5, wherein said system body further comprises:

a receiving section having a terminal electrically connected to said external storage unit and for receiving said external storage unit; and a lid for removably covering said receiving section.

7. A received data processing system according to claim 5, wherein said external storage unit takes the form of a disc.

8. A received data processing system for receiving automatic performance data transmitted externally and for performing an automatic performance process in accordance with the received automatic performance data, comprising:

a system body comprising a receiver for receiving the automatic performance data;

a storage unit provided removably in said system body for storing the automatic performance data received by said receiver;

a sound source provided in said system body for generating a performance sound; and an output section for driving sequentially said sound source in accordance with the automatic performance data stored in said storage unit to thereby output the corresponding performance sounds sequentially to the outside; and wherein said system body is a portable system body adapted to be worn on a wrist of a user.

9. A received data processing system according to claim 8, further comprising:

externally operable means provided in said system body; and control means responsive to said externally operable means for sequentially driving said sound source in accordance with the automatic performance data stored in said storage unit to thereby output the corresponding performance sounds sequentially from said output section means.

10. A received data processing system according to claim 8, further comprising:

a display unit provided in said system body; and a musical score display control section for controlling said display unit so as to display on said display unit a musical score corresponding to the automatic performance data stored in said storage unit.

11. A received data processing system according to claim 8, wherein said system body further comprises:

an accommodating section for accommodating said storage unit; and an openable lid for covering said accommodating section.

12. A received data processing system according to claim 8, wherein said storage unit comprises a disk storage device.

13. A received data processing system for receiving automatic performance data transmitted externally and for performing an automatic performance process in accordance with the received automatic performance data, comprising:

a channel number designator for designating a channel number indicative of a transmission station which transmits the automatic performance data to the outside;

a station selector for selecting a transmission station corresponding to the channel number designated by said channel number designator from among a plurality of transmission stations;

a receiver for receiving the automatic performance data transmitted from the transmission station selected by said station selector;

a storage unit for storing the automatic performance data received by said receiver;

a sound source for generating a performance sound; and control means for controlling said sound source in accordance with the automatic performance data stored in said storage unit to output the corresponding automatic performance sound to the outside.

14. A received data processing system according to claim 13, further comprising:

an externally operable section provided in said system body; and control means responsive to said externally operable means for sequentially driving said sound source means in accordance with the automatic performance data stored in said storage unit to thereby output the corresponding performance sounds sequentially to the outside.

15. A received data processing system according to claim 13, further comprising:

a display unit provided in said system body; and a musical score display control section for controlling said display unit so as to display on said display unit a musical score corresponding to the automatic performance data stored in said storage unit.

16. A received data processing system according to claim 13, wherein said system body further comprises:

an accommodating section for accommodating said storage unit; and an openable lid for covering said accommodating section.

17. A received data processing system according to claim 13, wherein said storage unit comprises a disk storage device.

18. A received data processing system according to claim 13, wherein said system body is a portable system body adapted to be worn on a wrist of a user.

19. A received data processing method of receiving automatic performance data transmitted externally and performing an automatic performance process in accordance with the received automatic performance data, comprising the steps of:

designating a channel number indicative of a transmission station for transmitting the automatic performance data to the outside;

selecting a transmission station corresponding to the channel number designated by said channel number designating step from among a plurality of transmission stations;

receiving the automatic performance data transmitted from the transmission station selected by said station selecting step;

storing the automatic performance data received by said reception step; and controlling sound source which generates a performance sound in accordance with the automatic performance data stored in said storing step to output the corresponding automatic performance sound to the outside.

20. A received data processing method according to claim 19, further comprising the steps of:

operating externally operable section; and sequentially driving, in response to the externally operable means operating step, the sound source in accordance with the automatic performance data stored in said storing step to sequentially output the corresponding performance sounds to the outside.

21. A received data processing method according to claim 19, further comprising the step of:

controlling a display unit so as to display on the display unit a musical score corresponding to the stored automatic performance data.

22. A received data processing system for receiving automatic performance data transmitted from a broadcasting station and for performing an automatic performance process in accordance with the received automatic performance data, comprising:

a mode setting device for setting one of a reception mode and a reproduction mode;

a storage unit for receiving the externally transmitted automatic performance data when the reception mode is set by said mode setting device, and for storing the received automatic performance data; and an output section for sequentially driving a sound source which generates a performance sound in accordance with the automatic performance data stored in said storage unit when the reproduction mode is set to thereby output the corresponding performance sounds sequentially to the outside.

23. A received data processing system according to claim 22, further comprising:

an externally operable section provided in said system body; and control means responsive to operation of said externally operable section for sequentially driving said sound source in accordance with the automatic performance data stored in said storage unit to thereby output the corresponding performance sounds sequentially from said output section means.

24. A received data processing system according to claim 22, further comprising:

a display unit provided in said system body; and a musical score display control section for controlling said display unit so as to display on said display unit a musical score corresponding to the automatic performance data stored in said storage unit.

25. A storage medium which contains a readable program for causing a computer to receive automatic performance data transmitted from a broadcasting station and to perform an automatic performance process in accordance with the received automatic performance data, wherein said program causes the computer to:

receive the externally transmitted automatic performance data when a reception mode is set by mode setting device for setting one of the reception mode and a reproduction mode and store the received automatic performance data in a storage unit; and sequentially driving a sound source which generates a performance sound in accordance with the automatic performance data stored in said storage unit when the reproduction mode is set to thereby output the corresponding performance sounds sequentially through an output section to the outside.

* * * * *